United States Patent
Byron et al.

(10) Patent No.: US 10,552,008 B2
(45) Date of Patent: Feb. 4, 2020

(54) MANAGING A DOMAIN SPECIFIC ONTOLOGY COLLECTION

(71) Applicant: International Business Machines Corporation, Armonk, NY (US)

(72) Inventors: Donna K. Byron, Petersham, MA (US); Lakshminarayanan Krishnamurthy, Round Rock, TX (US); William G. O'Keeffe, Tewksbury, MA (US); David D. Taieb, Charlestown, MA (US); Cale R. Vardy, East York (CA)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 14/748,822

(22) Filed: Jun. 24, 2015

(65) Prior Publication Data

US 2016/0378736 A1     Dec. 29, 2016

(51) Int. Cl.
*G06F 17/00*     (2019.01)
*G06F 3/0484*   (2013.01)
*G06F 16/36*     (2019.01)

(52) U.S. Cl.
CPC .......... *G06F 3/0484* (2013.01); *G06F 16/367* (2019.01)

(58) Field of Classification Search
CPC ............................ G06Q 10/06; G06F 17/2247
USPC ................................................. 715/234, 200
See application file for complete search history.

(56) References Cited

U.S. PATENT DOCUMENTS

| | | | | |
|---|---|---|---|---|
| 7,657,546 B2* | 2/2010 | Goodwin | .......... | G06F 17/30705 707/999.1 |
| 7,885,844 B1* | 2/2011 | Cohen | .................... | G06Q 10/10 |
| 7,991,760 B2 | 8/2011 | Kolz et al. | | |
| 9,501,565 B1* | 11/2016 | Ajmera | ............. | G06F 17/30705 |
| 9,626,159 B2* | 4/2017 | Mahmud | ............ | G06F 11/3414 |
| 2007/0162409 A1* | 7/2007 | Godden | ................... | G06N 5/02 706/48 |
| 2008/0288492 A1* | 11/2008 | Gemmell | .......... | G06F 17/30884 |
| 2009/0132506 A1* | 5/2009 | Houck | ............. | G06F 17/30976 |
| 2009/0198642 A1* | 8/2009 | Akkiraju | .................. | G06N 5/02 706/54 |
| 2010/0205229 A1* | 8/2010 | Jung | ................. | G06F 17/30997 707/805 |
| 2012/0198342 A1* | 8/2012 | Mahmud | ................... | G06F 8/30 715/733 |
| 2012/0284259 A1* | 11/2012 | Jehuda | ............. | G06F 17/30734 707/722 |
| 2013/0096944 A1 | 4/2013 | Shah et al. | | |
| 2015/0142828 A1* | 5/2015 | Nguyen | ............ | G06F 17/30734 707/749 |

(Continued)

OTHER PUBLICATIONS

Chandrasekaran, B. et al.; "What are Ontologies, and Why do We Need Them?"; IEEE Intelligent Systems; Jan./Feb. 1999; Copyright 1999 IEEE; pp. 20-26.

(Continued)

*Primary Examiner* — Manglesh M Patel
(74) *Attorney, Agent, or Firm* — Alexander G. Jochym (57) ABSTRACT

A domain specific ontology collection associated with a user is determined. At least one action of the user is received. A task for the user is determined based on the domain specific ontology collection for the user and the at least one action of the user.

15 Claims, 3 Drawing Sheets

(56) References Cited

U.S. PATENT DOCUMENTS

2015/0317408 A1* 11/2015 Hong ................ G06F 17/30958
707/798
2016/0078016 A1* 3/2016 Ng Tari ................ G06F 19/324
707/723

OTHER PUBLICATIONS

Wang et al.; "YaLi: a Crowdsourcing Plug-In for NERD"; SIGIR'13, Jul. 28-Aug. 1, 2013, Dublin, Ireland. ACM, pp. 1111-1112.

* cited by examiner

FIG. 3

MANAGING A DOMAIN SPECIFIC ONTOLOGY COLLECTION

BACKGROUND OF THE INVENTION

The present invention relates generally to the field of ontologies, and more particularly to managing a domain specific ontology collection.

An ontology is a formal naming and defining of the concepts, entities, and relationships that exist in a particular domain. Ontologies have become common on the World Wide Web. The ontologies can range from large taxonomies that categorize websites to categorization of products for sale, their features and reviews of the products. Ontologies may allow for sharing of common understanding of the structure of information, the reuse of domain knowledge, and analyzing of domain knowledge. Ontologies may include a lexicon which is the catalogue of all of the words found in the domain that the ontology may categorizes.

A subject matter expert is a person who is an authority in a particular area or topic. Often a subject matter expert is also called a domain expert. Subject matter experts are often used in a particular domain. A domain is any area of knowledge with specialized or professional vocabulary, such as medicine, accounting, telecom, insurance, software development, social services, etc. The subject matter expert may create, update, modify, expand, and verify a lexicon ontology collection in the domain the subject matter expert has expertise in.

SUMMARY

Embodiments of the present invention include a method, computer program product, and system for managing a domain specific ontology collection. In one embodiment, a domain specific ontology collection associated with a user is determined. At least one action of the user is received. A task for the user is determined based on the domain specific ontology collection for the user and the at least one action of the user.

DETAILED DESCRIPTION

Embodiments of the present invention provide for gathering information used to organize, update, change, modify, add, delete, or the like, a domain specific ontology collection. Embodiments of the present invention recognize that creating domain specific ontology collections is a long an expensive process.

Figure 1:
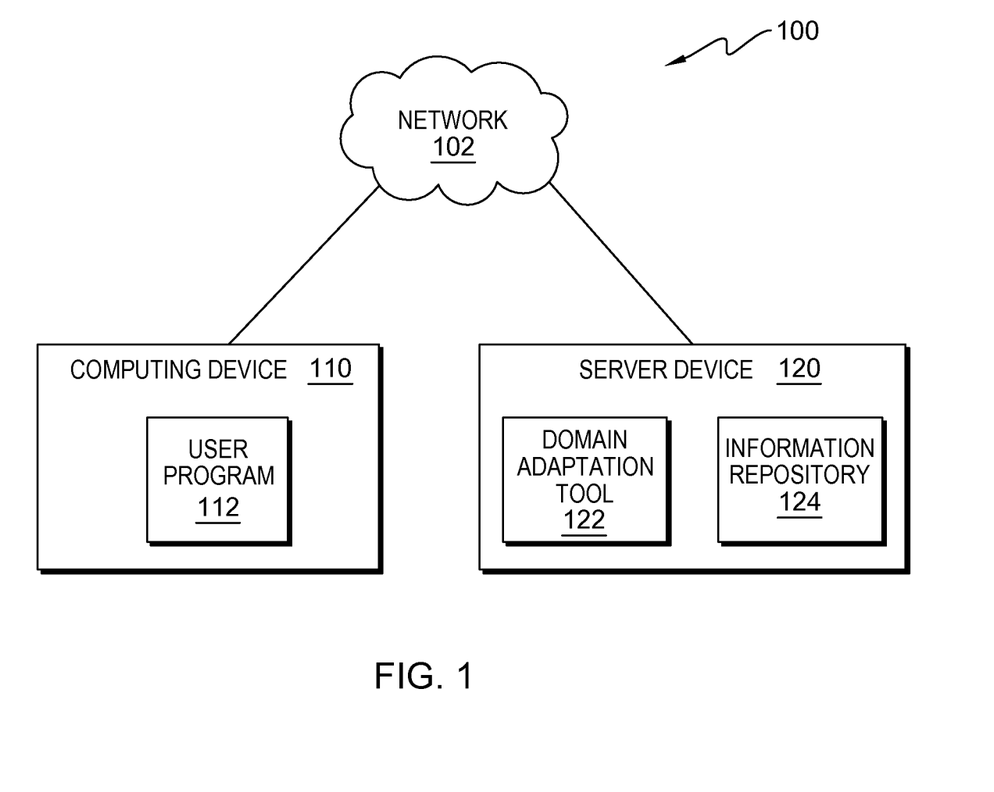
FIG. 1 is a functional block diagram of a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of one implementation and does not imply any limitations with regard to the systems and environments in which different embodiments can be implemented. Many modifications to the depicted embodiment can be made by those skilled in the art without departing from the scope of the invention as recited by the claims.

An embodiment of data processing environment 100 includes computing device 110 and server device 120, interconnected over network 102. Network 102 can be, for example, a local area network (LAN), a telecommunications network, a wide area network (WAN) such as the Internet, or any combination of the three, and include wired, wireless, or fiber optic connections. In general, network 102 can be any combination of connections and protocols that will support communications between computing device 110, server device 120, and any other computer connected to network 102, in accordance with embodiments of the present invention.

In example embodiments, computing device 110 can be a laptop, tablet, or netbook personal computer (PC), a desktop computer, a personal digital assistant (PDA), a smart phone, or any programmable electronic device capable of communicating with any computing device within data processing environment 100. In certain embodiments, computing device 110 collectively represents a computer system utilizing clustered computers and components (e.g., database server computers, application server computers, etc.) that act as a single pool of seamless resources when accessed by elements of data processing environment 100, such as in a cloud computing environment. In general, computing device 110 is representative of any electronic device or combination of electronic devices capable of executing computer readable program instructions. Computing device 110 can include components as depicted and described in further detail with respect to FIG. 3, in accordance with embodiments of the present invention.

Computing Device 110 includes user program 112. User program 112 is a program, application, or subprogram of a larger program for managing a domain specific ontology collection. In an embodiment, user program 112 may be an add-on program to a web browser. In another embodiment, user program 112 may be an add-on program to a word editor or any other content editor that supports add-on programs. User program 112 verifies login information of a user and then determines the domain specific ontology collections associated with the user. User program 112 determines tasks to be assigned to a user based on the domain specific ontology collections associated with the user and the previous actions of the user (i.e., website browsing history, electronic document history, etc.). User program 112 receives information from the user that completes, at least in part, the tasks assigned to the user and user program 112 updates information repository 124 with the received information.

A user interface (not shown) is a program that provides an interface between a user and user program 112. A user interface refers to the information (such as graphic, text, and sound) a program presents to a user and the control sequences the user employs to control the program. There are many types of user interfaces. In one embodiment, the user interface can be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In example embodiments, server device 120 can be a laptop, tablet, or netbook personal computer (PC), a desktop computer, a personal digital assistant (PDA), a smart phone, or any programmable electronic device capable of communicating with any computing device within data processing environment 100. In certain embodiments, computing device 110 collectively represents a computer system utilizing clustered computers and components (e.g., database server computers, application server computers, etc.) that act as a single pool of seamless resources when accessed by elements of data processing environment 100, such as in a cloud computing environment. In general, server device 120 is representative of any electronic device or combination of electronic devices capable of executing computer readable program instructions. Server device 120 can include components as depicted and described in further detail with respect to FIG. 3, in accordance with embodiments of the present invention.

Server device 120 includes domain adaptation tool 122 and information repository 124. Domain adaptation tool 122 is a program, application, or subprogram of a larger program for managing domain specific ontology collections found in information repository 124. Information repository 124 is a collection of data that describes knowledge about specific domains.

Domain adaptation tool 122 may organize, update, change, modify, add, delete, or the like, any information found in information repository 124. In an alternative embodiment, domain adaptation tool 122 may be found on computing device 110 or any other device (not shown) connected to network 102 that allows for communication between domain adaptation tool 122 and information repository 124. Domain adaptation tool 122 may provide login verification services for a user of computing device 110 (i.e., subject matter experts, administrators, managers, etc.) that allow the subject matter experts access to any of the domain specific ontology collections found in information repository 124.

In an embodiment, domain adaptation tool 122 may assign tasks to a user related to domain specific ontology collections found in information repository 124. In an alternative embodiment, domain adaptation tool 122 may monitor the actions of a user and assign tasks to the user based on the actions. In an embodiment, the actions of the user may be a user viewing a website, an electronic document, a content editor within a domain specific workflow, etc. In an embodiment, tools or programs for websites, electronic documents, content editors, etc., may have their own editors and domain adaptation tool 122 may be an add-on to the tools or programs. The tasks assigned to the user by domain adaptation tool 122 may include organizing, updating, changing, modifying, adding, deleting, or the like, any domain specific ontology collection found in information repository 124 with information found while the user is doing the tasks.

In an embodiment, information repository 124 may include information about domain specific ontology collections. In an embodiment, ontology collections are content theories about the sorts of objects, properties of objects, events and relations between objects, properties of objects, and events that are possible in a specified domain of knowledge. In an embodiment, the ontology collections may provide terms for describing knowledge about the domain. In an embodiment, the ontology collections may include vocabulary (i.e., lexicon) that describes conceptual elements and the relationships between the elements. In an embodiment, the ontology collections may include facts about a specific domain of knowledge. In an embodiment, the ontology collections may include beliefs, goals, hypotheses, and predictions about a specific domain of knowledge. In an embodiment, the ontology collections are formed in a taxonomic tree of conceptualization, from very general and domain independent characterization at the top levels to increasingly domain-specific at the lower levels. For example, information repository 124 may include dictionary entries, synonyms, hyponyms, abbreviations, alternate names, instance names such as proper names, metonymies and part whole relationships, domains, ranges (i.e., a list of states in the US would be a valid range for a property called state) etc., for domain specific ontology collections.

Information repository 124 may be implemented using any volatile or non-volatile storage media for storing information, as known in the art. For example, information repository 124 may be implemented with a tape library, optical library, one or more independent hard disk drives, or multiple hard disk drives in a redundant array of independent disks (RAID). Similarly, information repository 124 may be implemented with any suitable storage architecture known in the art, such as a relational database, an object-oriented database, or one or more tables.

Figure 2:
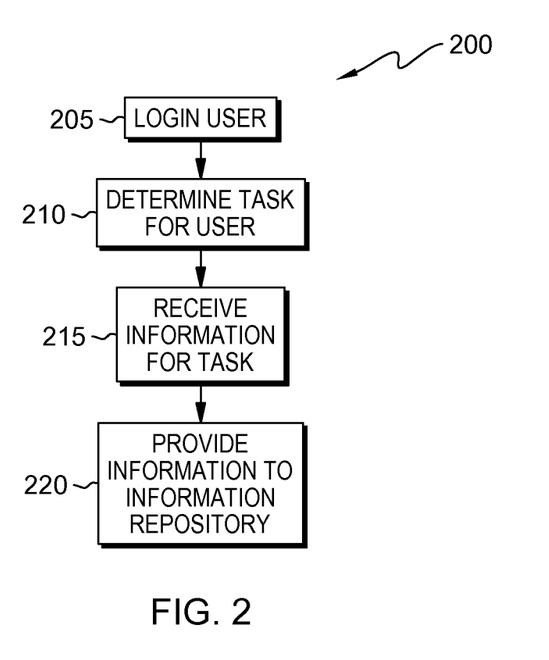
FIG. 2 is a flowchart depicting operational steps for managing a domain specific ontology collection, in accordance with an embodiment of the present invention.

FIG. 2 is a flowchart of workflow 200 depicting operational steps for managing a domain specific ontology collection, in accordance with an embodiment of the present invention. In one embodiment, the steps of the workflow are performed by user program 112. In an alternative embodiment, steps of the workflow can be performed by domain adaptation tool 122 while working with user program 112. In yet another alternative embodiment, steps of the workflow can be performed by any other program while working with user program 112. In an embodiment, user program 112 can invoke workflow 200 upon a user viewing a website or electronic document. In an alternative embodiment, user program 112 can invoke workflow 200 upon receiving an indication from domain adaptation tool 122 that a domain specific ontology collection in information repository 124 needs to be managed.

User program 112 logs in a user (step 205). A user (i.e., subject matter expert) accesses user program 112 via the user interface, discussed previously. In an embodiment, a user provides login credentials, which may include a password, and user program verifies the login credentials. In an alternative embodiment, user program 112 may communicate the login credentials to domain adaptation tool 122 to verify the login credentials. In an embodiment, upon verification of a user, user program 112 may determine, from domain adaptation tool 122, the areas of expertise of the user. In other words, a user may have specific areas of expertise that allow him to manage domain specific ontology collections associated with the areas of expertise of the user. For example, a user may have an area of expertise in automobiles and therefore the user is allowed to manage a domain specific ontology collection related to "Pickup Trucks." In an alternative embodiment, upon verification of a user, user program 112 may determine, from domain adaptation tool 122, the domain specific ontology collections that are associated with the user. In other words, a user may have identified domain specific ontology collections that the user is allowed to manage. For example, an administrator of information repository 124 may be allowed to manage a domain specific ontology collection related to "German Automobiles."

User program 112 determines a task for the user (step 210). In other words, user program 112 determines a task for the user based on the domain specific ontology collection that the user is allowed to manage. In an embodiment, user program 112 determines any information in a domain specific ontology collection that needs to be updated, verified, summarized, expanded, etc., and user program 112 creates a task for the user to provide the required information. For example, the user manages the domain specific ontology collection related to "Pickup Trucks" and user program 112 determines that in the ontology collection there is Pickup Truck A that does not have a year or years of production or a manufacturer. User program 112 creates a task for the user to determine the year or years of production and manufacturer of Pickup Truck A. In an alternative embodiment, user program 112 determines the previous actions of the user, such as internet history or previous electronic documents that the user has reviewed or analyzed, and applies natural language processing to the previous actions to determine if any of the previous actions of the user are related to a domain specific ontology collection the user manages. For example, User Paul has reviewed websites related to "European Automobiles" and has read a document entitled "German Muscle Cars of the 1980s". User program 112 determines that the reviewed websites are related to German Automobiles and that User Paul manages domain specific ontology collection related to "German Automobiles." User program 112 determines there is a word in the website related to "European Automobiles" that is not in the ontology collection "German Automobiles" and indicates to the user if the word should be included in the ontology collection and where the word should be included in the ontology collection (i.e., what other words and phrases the word is associated with). Additionally, user program 112 determines that the ontology collection "German Automobiles" does not have a section related to muscle cars of the 1980's in Germany and user program 112 indicates to the user if the information from the document entitled "German Muscle Cars of the 1980s" should be included in the ontology collection.

In an embodiment, user program 112 may create a task that indicates to the user if an unknown word is related (synonym, antonym, etc.) to another word. In an embodiment, user program 112 may create a task that indicates annotations currently in domain specific ontology collections and asks the user to validate the annotation. In an embodiment, user program 112 may create a task that indicates websites or electronic documents for the user to navigate to and use the websites or electronic documents to provide information for a domain specific ontology collection. In an embodiment, user program 112 may create a task that indicates to the user to populate a knowledge graph in a domain specific ontology collection with new entities and relationships from a web site or electronic document. In an embodiment, user program 112 may create a task that adds terms of a domain specific ontology collection. In an embodiment, user program 112 may create a task of adding branches to a domain specific ontology collection. In an embodiment, user program 112 may create a task that organizes a domain specific ontology collection. In an embodiment, user program 112 may create a task that validates the work done by others in a domain specific ontology collection. In an embodiment, user program 112 may assign tasks that are created by an administrator and input into user program 112. In an embodiment, user program 112 may generate and suggest synonyms, antonym, acronyms, homonyms, metonyms to words found in information repository 124 of a specific ontology collection and the user may confirm or decline the generated words. In an embodiment, user program 112 may infer relationships like co-references that may be hidden across sentences and the user may confirm or decline these relationships. User program 112 may detect event types and show events and the user may confirm or decline these events. User program 112 may detect type vs instances (i.e., President vs Barack Obama) and the user may confirm or decline these relationships. User program 112 may suggest new domain types and ranges and the user may confirm or decline these domain types and ranges.

User program 112 receives information for the task (step 215). In an embodiment, a user indicates to user program 112 information found in the websites or electronic documents that will complete, at least part, of the task assigned to the user. In an embodiment, the user may indicate to user program 112 specific text regarding a word or an indication of matching or association between words. In an alternative embodiment, the indication may include notifying user program 112 of a specific area or section of the website or electronic document that completes the task. For example, the user may type text that indicates to user program 112 that Pickup Truck A was produced between 1983 and 1985. Additionally, the user may input text that indicates to user program 112 that Pickup A was manufactured by Company A. In another example, the user may highlight or differentiate an area of an electronic document that indicates to user program 112 that the most produced German Muscle Cars of the 1980s were: 1. Muscle Car A; 2. Muscle Car B; 3. Muscle Car C; 4. Muscle Car D; and 5. Muscle Car E. In an embodiment, the user may indicate information to user program 112 that does not complete an assigned task but completes a new task created by the user. For example, the user may find information on German Muscle Cars of the 1970s and indicate to user program 112 that this information could be added to a task of updating information in a domain specific ontology collection about German Muscle Cars of any time.

User program 112 provides information to information repository 124 (step 220). In other words, user program 112 updates information repository 124 with the information received for the task. In an embodiment, user program 112 updates information repository 124. In an alternative embodiment, user program 112 provides the information to domain adaptation tool 122 and domain adaptation tool 122 updates information repository 124. In an embodiment, user program 112 may determine, after updating information repository 124, that information repository 124 needs additional information for the domain specific ontology collection and may create additional tasks for the user.

Figure 3:
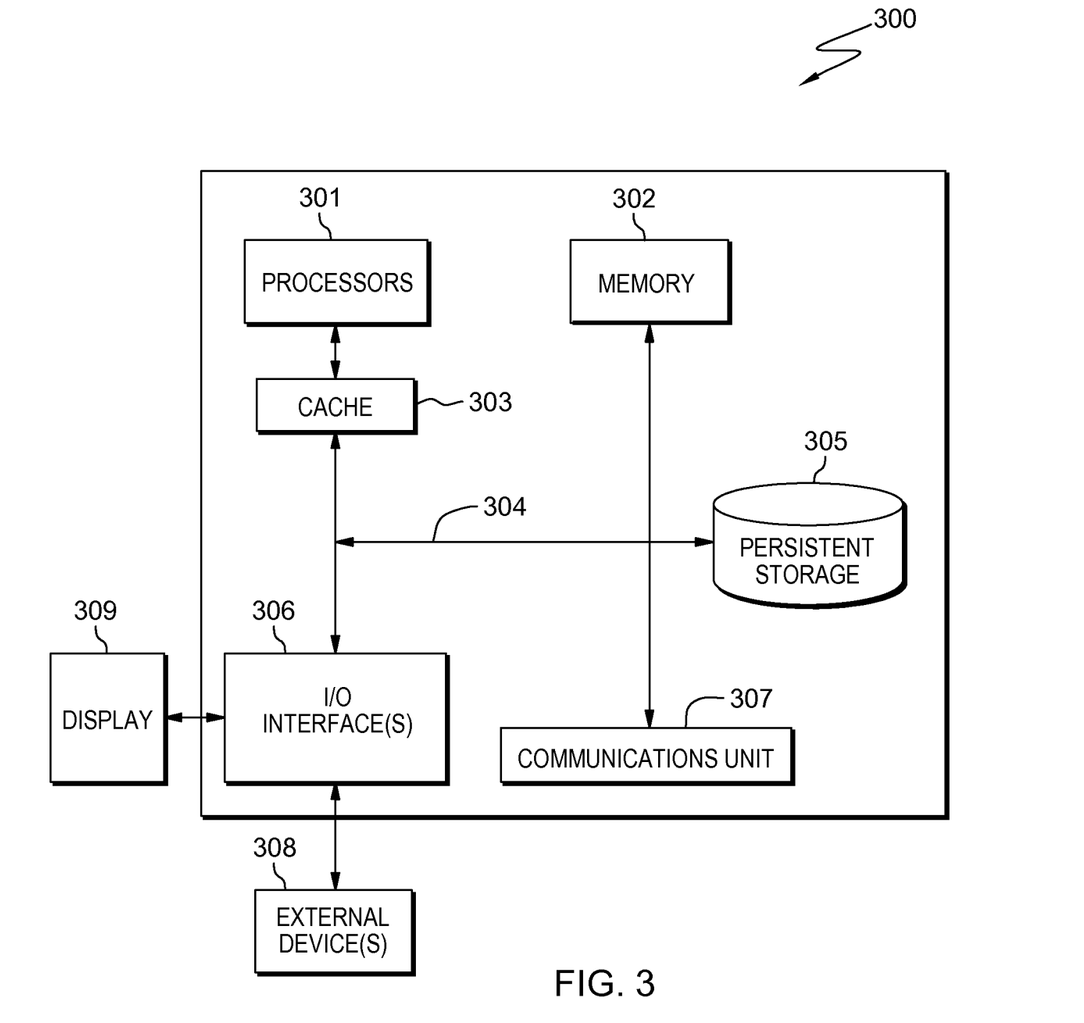
FIG. 3 depicts a block diagram of components of the computer of FIG. 1, in accordance with an embodiment of the present invention.

FIG. 3 depicts computer 300 that is an example of a computing system that includes user program 112 or domain adaptation tool 122. Computer 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing a domain specific ontology collection, the method comprising the steps of:

determining, by one or more computer processors, a plurality of domain specific ontology collection associated with a user, wherein a domain specific ontology collection represents a catalogue of words found in the domain specific ontology collection;

determining, by one or more computer processors, an internet browsing history of the user;

determining, by one or more computer processors, a domain specific ontology collection of the plurality of domain specific ontology collection associated with the user related to a website of the internet browsing history of the user using natural language processing;

determining, by one or more computer processors, a task for the user, wherein the task indicates a website in the internet browsing history for the user to use to update the domain specific ontology collection by adding an element that modifies the domain specific ontology collection;

providing, by one or more computer processors, the task to the user;

receiving, by one or more computer processors, the element to add found in the website to complete the task from the user; and updating, by one or more computer processors, the domain specific ontology collection with the received information.

2. The method of claim 1, wherein the task is one or more of the following: organizing; changing; modifying; verifying, adding; or deleting an element of the domain specific ontology collection.

3. The method of claim 2, further comprising:

determining, by one or more computer processors, an alternate element for the element; and receiving, by one or more computer processors, an indication from the user, wherein the indication confirms, declines, or modifies the alternate element.

4. The method of claim 3, wherein the alternate element is one of the following: a synonym of the element, an antonym of the element, an acronym of the element, a homonym of the element, or a metonym of the element.

5. The method of claim 3, wherein the alternate element is one of the following: a new relationship for the element, an event type for the element, an entity type for the element, an instance for the element, a range of valid values for the element.

6. A computer program product for managing a domain specific ontology collection, the computer program product comprising:

one or more computer readable storage media; and program instructions stored on the one or more computer readable storage media, the program instructions comprising:

program instructions to determine a plurality of domain specific ontology collection associated with a user, wherein a domain specific ontology collection represents a catalogue of words found in the domain specific ontology collection;

program instructions to determine an internet browsing history of the user;

program instructions to determine a domain specific ontology collection of the plurality of domain specific ontology collection associated with the user related to a website of the internet browsing history of the user using natural language processing;

program instructions to determine a task for the user, wherein task indicates a website in the internet browsing history for the user to use to update the domain specific ontology collection by adding an element that modifies the domain specific ontology collection;

program instructions to provide the task to the user;

program instructions to receive the element to add found in the website to complete the task from the user; and program instructions to update the domain specific ontology collection with the received information.

7. The computer program product of claim 6, wherein the task is one or more of the following: organizing; changing; modifying; verifying, adding; or deleting an element of the domain specific ontology collection.

8. The computer program product of claim 7, further comprising program instructions, stored on the one or more computer readable storage media, to:

determine an alternate element for the element; and receive an indication from the user, wherein the indication confirms, declines, or modifies the alternate element.

9. The computer program product of claim 8, wherein the alternate element is one of the following: a synonym of the element, an antonym of the element, an acronym of the element, a homonym of the element, or a metonym of the element.

10. The computer program product of claim 8, wherein the alternate element is one of the following: a new relationship for the element, an event type for the element, an entity type for the element, an instance for the element, a range of valid values for the element.

11. A computer system for managing a domain specific ontology collection, the computer system comprising:

one or more computer processors;

one or more computer readable storage media; and program instructions, stored on the one or more computer readable storage media for execution by at least one of the one or more computer processors, the program instructions comprising:

program instructions to determine a plurality of domain specific ontology collection associated with a user, wherein a domain specific ontology collection represents a catalogue of words found in the domain specific ontology collection;

program instructions to determine an internet browsing history of the user;

program instructions to determine a domain specific ontology collection of the plurality of domain specific ontology collection associated with the user related to a website of the internet browsing history of the user using natural language processing;

program instructions to determine a task for the user, wherein task indicates a website in the internet browsing history for the user to use to update the domain specific ontology collection by adding an element that modifies the domain specific ontology collection;

program instructions to provide the task to the user;

program instructions to receive the element to add found in the website to complete the task from the user; and program instructions to update the domain specific ontology collection with the received information.

12. The computer system of claim 11, wherein the task is one or more of the following: organizing; changing; modifying; verifying, adding; or deleting an element of the domain specific ontology collection.

13. The computer system of claim 12, further comprising program instructions, stored on the one or more computer readable storage media for execution by at least one of the one or more computer processors, to:

determine an alternate element for the element; and receive an indication from the user, wherein the indication confirms, declines, or modifies the alternate element.

14. The computer system of claim 13, wherein the alternate element is one of the following: a synonym of the element, an antonym of the element, an acronym of the element, a homonym of the element, or a metonym of the element.

15. The computer system of claim 13, wherein the alternate element is one of the following: a new relationship for the element, an event type for the element, an entity type for the element, an instance for the element, a range of valid values for the element.

* * * * *